United States Patent [19]

Benoit

[11] 4,172,753

[45] Oct. 30, 1979

[54] DEVICE FOR CONTROLLING TILT OF LABELLING PAD ON LABELLING APPARATUS

[75] Inventor: Horst A. Benoit, Mississauga, Canada

[73] Assignee: Stackpole Machinery Company, Bloomfield, N.J.

[21] Appl. No.: 855,338

[22] Filed: Nov. 28, 1977

[51] Int. Cl.² .......................... B32B 31/00; B65C 9/00

[52] U.S. Cl. ...................................... 156/357; 156/566

[58] Field of Search ......................... 156/357, 566, 560

[56] References Cited

U.S. PATENT DOCUMENTS

| | | | |
|---|---|---|---|
| 2,773,617 | 12/1956 | Weiss | 156/357 |
| 2,983,398 | 5/1961 | Carter | 156/566 |
| 3,159,522 | 12/1964 | Schmidt | 156/566 |
| 3,751,322 | 8/1973 | Schulz | 156/566 |

FOREIGN PATENT DOCUMENTS

| | | |
|---|---|---|
| 618872 | 4/1947 | United Kingdom . |
| 783090 | 9/1957 | United Kingdom . |
| 857805 | 1/1961 | United Kingdom . |
| 1007006 | 10/1965 | United Kingdom . |
| 1009735 | 11/1965 | United Kingdom . |

*Primary Examiner*—Douglas J. Drummond

[57] ABSTRACT

A labelling apparatus comprises a label applying means for applying a label to an article, conveyor means, label magazine, means for transferring a label from the magazine to the label applying means. The label applying means has a support structure on which a label carrier means is pivotally mounted about a horizontal axis and pivot control means for controlling the position of the label carrier means. The pivot control means is timed to pivot the label carrier means about the horizontal axis in a direction towards and away from a position at which the label carrier means contacts and applies a label to an article as the article is conveyed past the label applying means.

23 Claims, 6 Drawing Figures

FIG. 3.
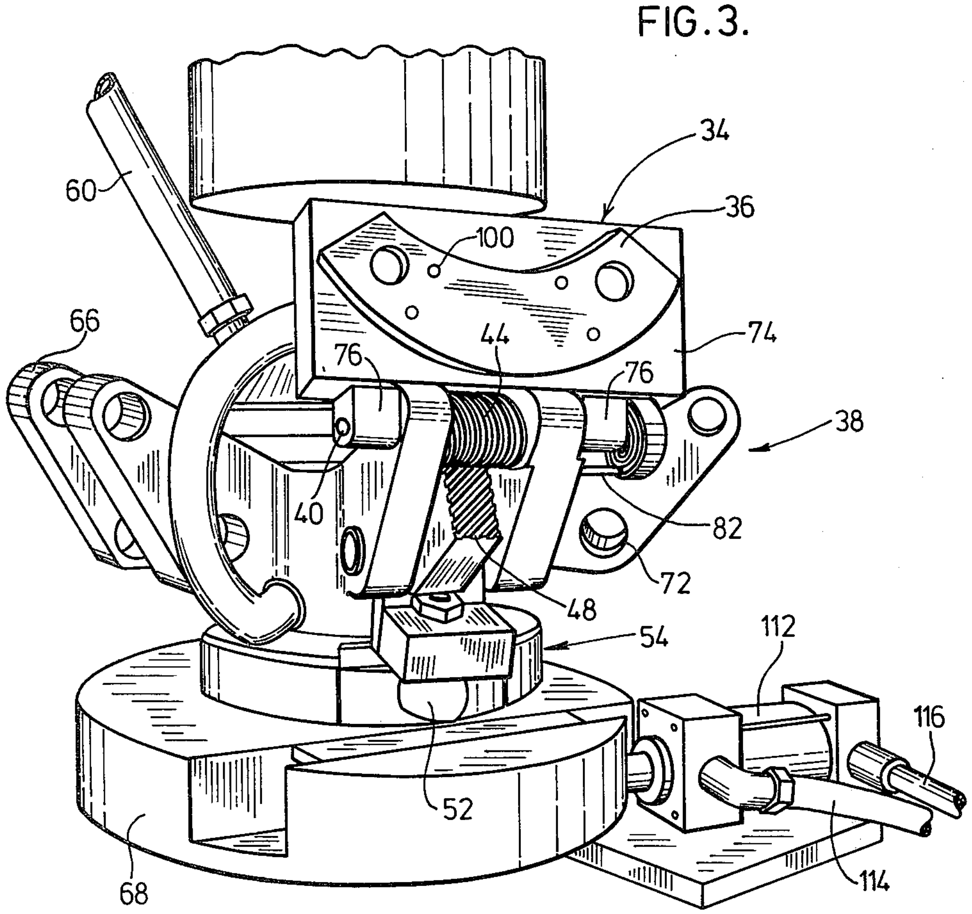
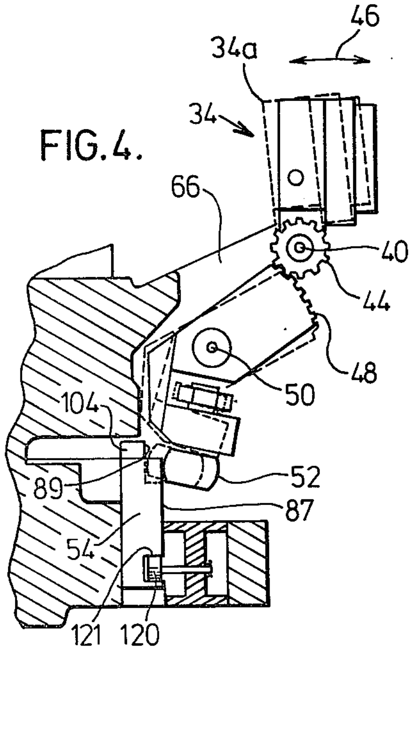
FIG. 4.
FIG. 5.
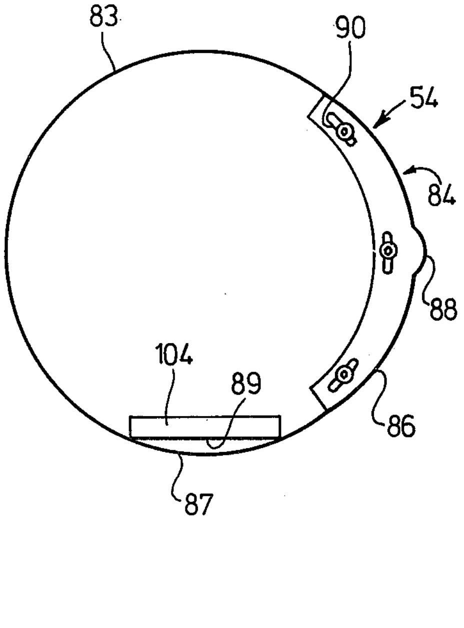

DEVICE FOR CONTROLLING TILT OF LABELLING PAD ON LABELLING APPARATUS

FIELD OF THE INVENTION

This invention relates to labelling apparatus and more particularly to a label applying means for applying labels to either slanted or verticle surfaces on an article.

BACKGROUND OF THE INVENTION

In the labelling art it has always been considered a problem to apply in an automatic manner labels to slanted surfaces on articles. An example of an automatic labelling apparatus is disclosed in Canadian Pat. No. 745,003. It is necessary with labelling apparatus disclosed in this Canadian Patent to tilt the base plate on which the apparatus rests so that the pad which applies the label to the container is coincident with the article slanted surface. Although this known apparatus is satisfactory for applying labels on surfaces inclined away from vertical at up to 45°, complications do arise in the drive for the labelling mechanism and there are glue applying problems in view of the tilt at which the glue roll and glue storage pot operate.

A further difficulty encountered with known labelling apparatus is that it requires considerable set up time in adapting the apparatus to label new shapes of articles. This can result in extended costly shut down times.

SUMMARY OF THE INVENTION

The labelling apparatus according to this invention has a label applying device which overcomes the problems associated with the existing labellers in applying a label to slanted surfaces on an article. The labelling device is readily adjustable for applying labels to either vertical or slanted surfaces of a bottle resulting in minimum machine shut down time. The labelling device has a high degree of flexibility to accommodate application of labels to surfaces which may have a negative, vertical or positive inclination without having to tilt the base plate of the device. As a result, several identical labelling devices according to this invention may be used on a labelling machine to apply labels to back, front, neck and shoulder of an article such as a liquor bottle.

According to an aspect of the invention the labelling apparatus includes conveyor means for conveying an article past the label applying means and means for providing a label on the label applying means. The label applying means comprises a support means or body portion which has mounted thereon a label carrier means. Such means is pivotally mounted about a horizontal axis on the support means. Pivot control means is provided on the support means for controlling the pivotal movement of the label carrier means. The pivot control means is synchronized to pivot the label carrier means about the horizontal axis in a direction towards and away from a position at which the label carrier contacts and applies a label to an article as such article is conveyed past the label applying means. The extent to which the pivot control means pivots the label carrier is determined by the slope of the article surface to which a label is applied.

According to another aspect of this invention, the pivot control means for the pivotally mounted label carrier means may be provided with an adjustable means for varying the extent to which the label carrier means is tilted. This arrangement therefore permits set-up time for a new shape of article to be accomplished in a matter of minutes.

The support means of the label applying device may according to further aspect of the invention be in the form of a hub which rotates about a vertical axis. The speed of rotation of the hub is synchronized with the conveyed speed of the article so that a label is applied to each article as it is conveyed past the label applying means.

A further consideration with this label applying device is that the label carrier means as it is pivoted on the support member may be readily withdrawn upon a "no label" condition on the label carrier means. The point of withdrawal coincides with the point at which a glue applying means applies glue to a label thereby avoiding application of glue to the bear label carrier means.

DESCRIPTION OF THE DRAWINGS

These and other advantages and features of the invention will become apparent in the following detailed description of the preferred embodiments of the invention as shown in the drawings wherein:

FIG. 3 is another perspective view of the label applying device showing a preferred arrangement for the pivot control means;

FIG. 4 is an elevation of the label carrier means pivotally mounted on the label applying device showing the retraction of the label carrier means;

FIG. 5 shows a representative cam configuration for the pivot control means;

DETAILED DESCRIPTION OF THE PREFERRED EMBODIMENTS

Figure 1:
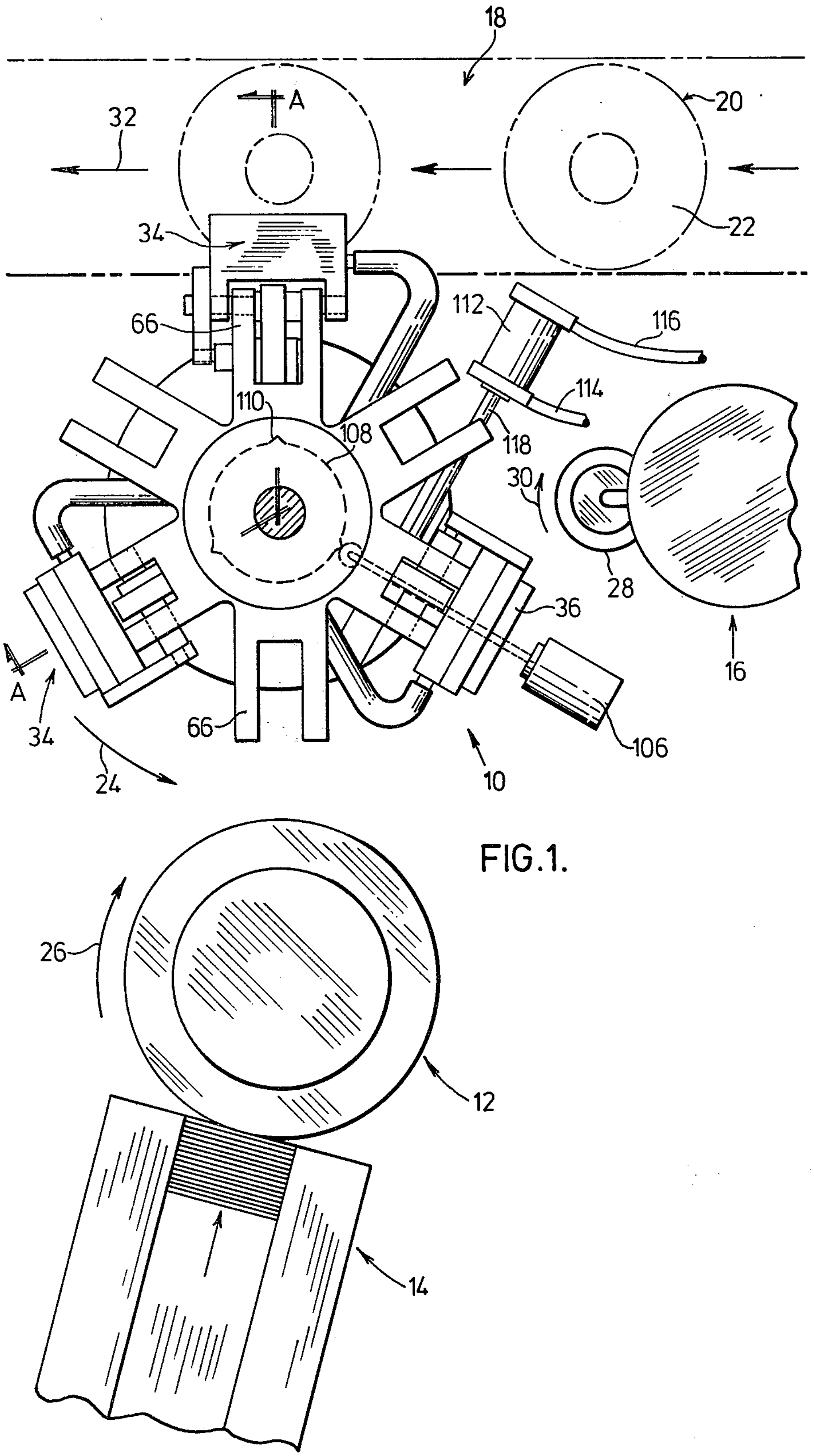
FIG. 1 is a top plan view of a portion of a labelling apparatus including a label applying device according to preferred embodiment of this invention.

In the particular embodiment shown in FIG. 1, the labelling apparatus has a label applying device 10 which picks up a label from label transfer drum 12. A label magazine 14 supplies labels to the transfer drum 12. The label applying device 10 passes the label by the glue applying device 16 to apply glue to the label prior to its application to an article. A conveyor 18 conveys articles or containers 20 in the direction of arrow 32 past the label applying device 10 so that a label may be applied to a slanted surface 22.

The label magazine, label transfer means and glue applying means may be of the type disclosed in Canadian Pat. No. 745,003. The conveyor system 18 may be of the conventional type which includes a bottle spotter and bottle registration mechanism so that the bottles are evenly spaced apart on the conveyor and the labels are applied to the same locations on each container. In the operation of the label applying device 10, it rotates in the direction of arrow 24 in picking up a label from revolving label transfer or gripper drum 12 which rotates in the direction of arrow 26 and it passes the glue roll 28 which rotates in the direction of arrow 30. It is understood that the principal of pivotally mounting the label carrier means on the label applying device 10 may be used on other types of labelling devices which may involve a reciprocal motion in applying labels to the containers as they pass a label applying device or other types of systems which may travel along with the bottle in applying a label to the container to obtain the intended advantages. It is also understood that various forms of transfer means and means for applying glue to labels or bottles may be used as is readily appreciated by those skilled in the art.

Figure 2:
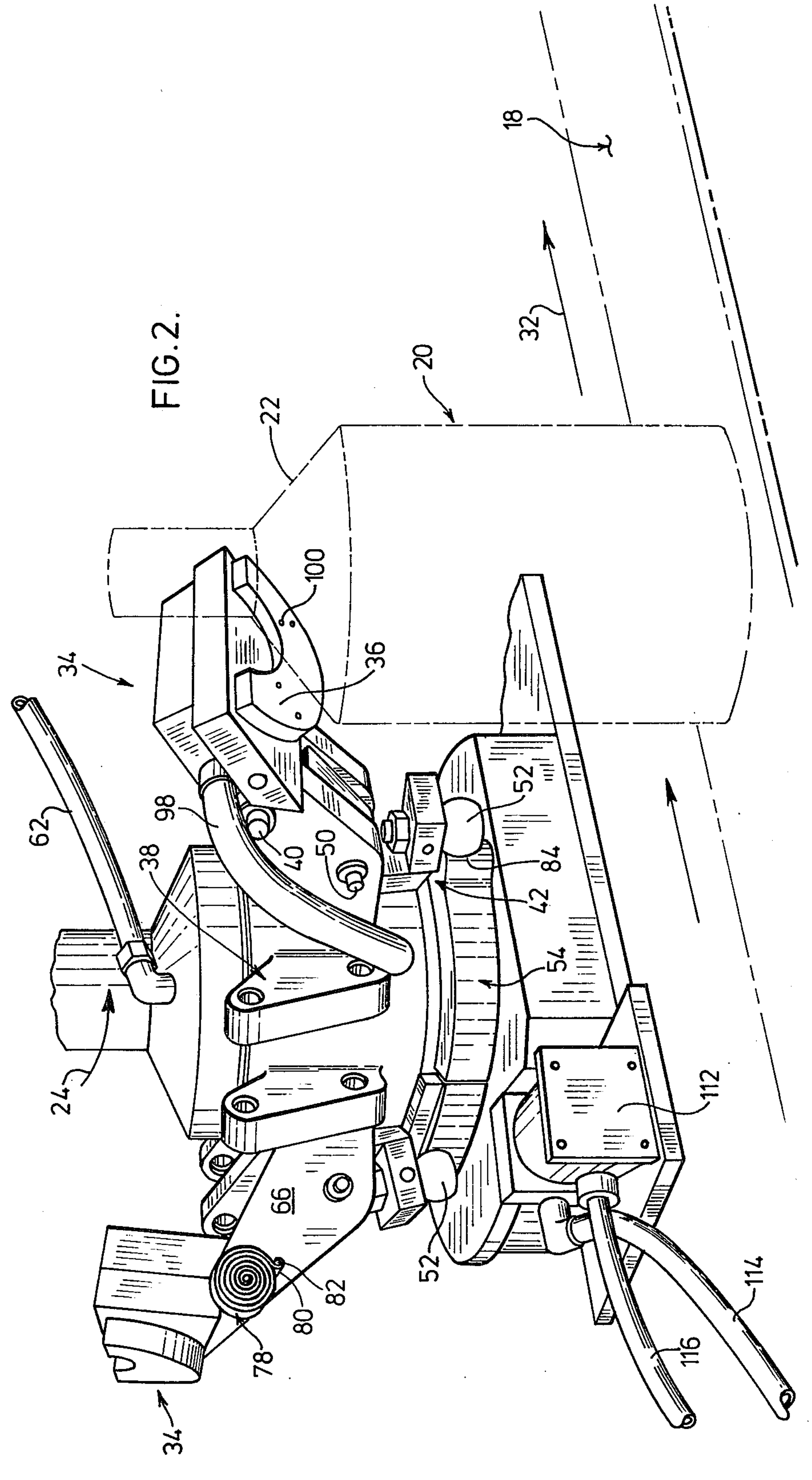
FIG. 2 is a perspective view of the label applying device applying a label to a container.

As mentioned, a particularly difficult labelling step is applying a label to a slanted surface such as 22 of a container 20. As shown in FIG. 2 a container 20 as it is conveyed past the label applying device 10 has a label carrier means 34 having positioned thereon a label carrier pad 36 which may be compressible. The label carrying means 34 is pivotally mounted on support means 38 and it is adapted to pivot about a horizontal axis defined by shaft 40. A pivot control means generally designated at 42 is adapted to and is synchronized to tilt or pivot the pad 36 such that it coincides with the inclination of surface 22 and contact such surface to apply a label thereto as the container 20 is conveyed past the label applying device 10.

Although the configuration of label carrier pad 36 is horseshoe shaped, it is understood that other configurations may be used as determined by the label shape. The label carrier means 34 may be provided with a quick release mechanism which allows fast interchange of pad members 36.

FIG. 4 shows the components of a preferred pivot controlled means. In this embodiment, the label carrier means 34 has a gear member 44 mounted on shaft 40. Meshed with gear member 44 is a gear segment 48 which is pivotally mounted on the support means 38 about shaft 50 so that pivotal movement of gear segment 48 causes a reverse direction of movement in the label carrier 34 as indicated by arrow 46. A cam follower 52 is mounted on the lower leg of gear segment 48. The cam follower engages a stationary cam generally designated at 54 which is also shown in FIGS. 2, 3 and 5. The circumferential configuration of cam portion 54 determines the position of the label carrier 34 as the support means 38 revolves in a direction of arrow 24.

Figure 6:
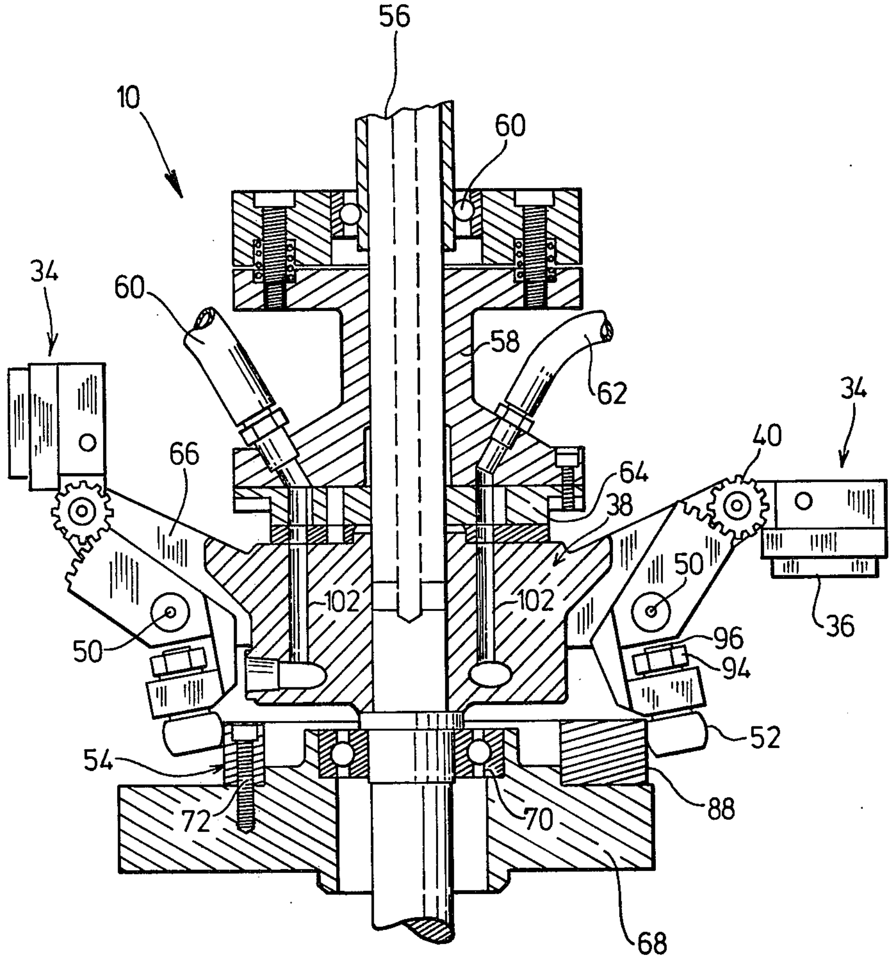
FIG. 6 is a section through lines A—A of FIG. 1.

Turning to FIG. 6, the label applying device 10 has passing therethrough a central drive shaft 56 which is driven by an arrangement not shown. A stationary collar 58 is mounted on shaft 56 by bearings 60 which allows the shaft to rotate freely. Connected to collar 58 is a vacuum line 60 always under vacuum and pressurized air line 62 always under pressure. A stationary gallery 64 which is secured to collar 58 is in communication with the vacuum and air lines 60 and 62 and has various ports the purpose of which will be discussed hereinafter. Secured to shaft 56 is the rotatable support portion or hub 38 which rotates with the shaft 56. With the particular embodiment shown there are six evenly spaced-apart yoke portions 66 on which the label carrier means and the pivot control means are mounted. The base plate 68 is stationary and the shaft is bearingly mounted therein at 70. The cam 54 is connected to base plate 68 by Allan screws 72.

As more clearly shown in FIG. 3, the yokes 66 have aligned apertures 70 and 72. Shafts 40 and 50 are mounted respectively in apertures 70 and 72. Two arms 76 which are integral with the base plate 79 of the label carrier 34 are mounted on shaft 40. Shaft 40 locates the horizontal axis about which the label carrier 34 pivots. The view of the pivot control means 42 in FIG. 3 shows that the gear segment 48 and intermeshing gear member 44 have helical shaped teeth. The purpose of this construction is to reduce the amount of play in the device so that with the helical shaped teeth more than one tooth of the intermeshing set are engaged at all times. This avoids sloppiness in the movement of the label carrier 34.

As shown in FIG. 2, a coiled spring 78 is connected to and coiled about shaft 40 with its free end 80 secured to a pin 82 on yoke arm 66. This exerts a moment about shaft 40 which swings label carrier 34 in a direction inwards towards the hub 38. This causes the gear segment 48 to pivot in a direction about shaft 50 so as to always maintain cam follower 52 against cam 54. As can be appreciated with the particular arrangement shown, a relatively small coiled spring can be used to apply sufficient pressure on the cam follower to ensure that the cam follower continually engages the cam 54.

The speed of rotation of the hub 38 is synchronized with the conveyed movement of containers 20 so that the label carrier 34 is in the tilted position as shown in FIG. 1 when the container 20 is aligned with label carrier 34 for receipt of a label. As the hub 38 rotates, the relationship between the cam follower 52 and the cam 54 is such to position the label carrier 34 in a vertical position as shown in FIG. 6 for pick-up of a label from label transfer device 12 and application of glue by the glue roll 28.

From this point it is necessary to tilt or pivot the pad to be coincident with the inclination of the surface 22 of the container. This is accomplished by the cam configuration such as shown in FIG. 5. The rear portion circumference of the cam 83 is essentially circular and of a diameter such that the label carrier 34 is maintained in a vertical position. In the front part of cam 54 is an interchangeable portion 84 having portion 86 which slightly increases in a gradual manner the radius of the cam and includes a raised or hump portion 88. The interchangeable portion 84 is secured to the base plate 68 by way of Allan screws which pass through elongate apertures 90 which allow for adjustment. The portion 86 of the cam begins the pivoting or tilting of label carrier 34 in an outward and downward direction. As the cam follower 52 moves up onto hump 88 the pad is tilted further and when it is at the radial extent of hump 88, the label carrier 34 is then at the desired inclination and is in contact with surface 22 of the container to apply a label thereto.

The purpose of hump 88 is to kick the label carrier 34 outwardly to the desired inclination for contacting the slanted surface of a container and then withdraw the label carrier as the cam follower rides down hump 88. The kicking action is desirable because of the difference in directions of motions of the label carrier and the conveyed container. In order to avoid smudging or misalignment of a label as it is applied to a container, the label carrier 34 can only contact the container for an instant because the label carrier is moving towards the container and away from the container at an angle relative to the direction of travel of the container. If the label carrier were to contact the container for an extended length of time this would result in smudging or mislocation of the label because the label carrier would tend to drag the label down the container surface 22 as it is moved away from the container. However, this outward kicking action of the label carrier brings about an instantaneous contact between the label carrier pad 36 and the container slanted surface 22. During this instant the label contacts the container. In using a compressible pad 36, the pad may be compressed slightly on contacting the container surface so that a band portion of the label is pressed against the container. By virtue of the glue and other assists to be discussed, the label adheres to the container after which the label carrier is immediately retracted.

The label applying device may be used to apply labels to vertical surfaces. For this arrangement, it would not be necessary to provide a kick-out for the label carrier because the pad would be in its vertical position and in rotating past container 20 it would roll the label on to the container. It would therefore only be necessary to arrange the shape of cam portion 86 and position of the label applying device to ensure that the pad is vertical and is coincident with the container's sidewall.

The pivot control means 42 swings the label carrier 34 downwardly to apply a label to a slanted surface on a container. It can be appreciated in applying a label to a container having a surface slope the reverse of that shown in FIG. 2, the label applying device can be inverted so that the axis of pivot for the label carrier 34 is above the label carrier. The gear segment 48 would be arranged so as to swing the label carrier in an upward and outward direction to contact a negative slope surface on a container. It is also understood that the pivotal axis of label carrier 34 may be through the label carrier 34 where the pad is tilted to the correct position and then if necessary an arrangement be provided on the device to kick the entire assembly outwardly to contact a bottled surface as is conveyed past the device.

The interchangeable portion 84 of the cam provides in this embodiment of the invention the adjustable aspect of the pivot control means. As explained the portion 86 and when present hump 88 cause the label pad to be tilted the correct amount to properly contact an article surface. Several interchangeable portions 84 may be made where each portion 84 is shaped to provide for labelling a particular article surface. In a line change over for a different article, the appropriate portion 84 is selected for that article and interchanged with that already in the cam 54 so that the labelling apparatus is now ready to label a new article. This ready adjustability of the pivot control means greatly reduces shut down time in label applying device change over for new product lines.

It is, therefore, understood that several different arrangements may be employed to take advantage of the principle of this invention in applying labels to containers. In view of the flexibility of this device, several of the same may be used for all label applying stations on an automatic labelling apparatus. This cuts down on parts inventory and permits the automatic labelling apparatus to be readily changed over for labelling different container shapes.

As shown in FIG. 6, the cam follower 52 has a rounded convex shape, to reduce wear and to maintain proper contact between follower and cam as the follower is moved inwardly and outwardly about pivot point 50. The follower 52 is mounted on member 92 of gear segment by nut 94 threaded about spindle 96 of follower 52. An eccentric sleeve may surround spindle 96 to allow adjustment of follower 52 with respect to member 92 to provide a fine adjustment in exactly positioning label carrier 34.

With reference to FIG. 6 the valve determines when a vacuum or a blast of air is applied to the carrier pad 34. As shown in FIG. 2 flexible hose 98 extends from the hub 38 up to the carrier pad 34. In the surface of carrier pad 36 are a plurality of ports 100 which are in communication with line 98. The gallery 64 acts as a valve and determines when either vacuum or blast of air is applied to the system and in turn at ports 100. As shown in FIG. 6 the hub 38 has internally thereof a plurality of bores 102 which communicate with tubes 98. The bores 102, as they rotate, are in communication with various ports (not shown) in valve 64 to either have applied thereto a vacuum or air blast. The ports in valve 64 are arranged so that vacuum is applied to ports 100 as a label is about to be picked from label transfer drum 12 to hold the label on the pad and maintain vacuum on the ports 100 as glue is applied to the label. As the label carrier 34 is kicked outwardly to contact a bottle surface, the bore 102 moves into communication with a port under pressure in valve 64 so that at the instant the label contacts a bottle, a blast of air is applied to ports 100 to blow the label away from the pad 36 and ensure a positive transfer of the label to the container.

In some instances there may be a container absent in a series of spaced apart containers on the conveyor. Sensing apparatus may be provided to sense when a container is absent and prevent the label transfer device 12 from picking a label from magazine 14 and transferring it to label carrier pad 36. Also due to a faulty label transfer mechanism, the absence of labels or failure to pick a label from the label magazine can result in a "no label" condition on the label carrier pad 36. Provision therefore has to be made to withdraw the label carrier pad 36 so that the bear pad 36 does not contact the glue applying device 16.

With the particular embodiment shown this provision can be readily incorporated into the device by providing in the cam configuration 54 a moveable part 104 which has two positions. A first position which is normal, is that shown in FIG. 3 which continues at 87 the circumferential configuration of the cam portion 83. A second position as shown in shadow in FIG. 4 reduces the radial dimension at 89 of the cam thereby withdrawing the label carrier 34 back to the position 34*a* as shown in shadow. The location of moveable part 104 is in the area which determines the position of the pad as it passes the glue applying device 16.

As shown in FIG. 1 an electronic eye device 106 is provided. At the top of the label applying device 10 is a plate 108 having projections 110. The plate revolves with the hub where the projections activate a switch to turn the electronic eye 106 on to determine if a label is on pad 36. In a "no label" condition the electronic eye actuates a valve mechanism to apply compressed air to cylinder 112 which is fed through line 114. This withdraws piston rod 118 and causes a roller 120 as shown in FIG. 4 to move along moveable part 104 wherein a slanted slot 121 is provided. The upward slope of such slot causes part 104 to move downwardly so that as the cam follower approaches moveable part 104 in its second position, the label carrier 34 is withdrawn to position 34A. After the electronic eye 106 is shut off the label carrier 34 is past glue roll 28. The moveable part 104 is moved back to its first position by applying compressed air to line 116 to extend piston rod 118. It is therefore apparent with this device that the aspect of withdrawing the pad away from the glue roll 28 is readily accomplished in an efficient reliable manner.

In applying labels to containers having a slight taper from top to bottom, the aspect in withdrawing the pad for a "no label" condition may be used in applying a label to this type of bottle. As shown in FIG. 4, the pad 36 may be withdrawn several degrees and approximately up to 15 degrees. Assuming the taper of the bottle is approximately 7 degrees the label as applied to the carrier may be in the vertical position for receipt of glue. The cam segment 86 is provided with a negative portion with a slight hump in area 88 to kick the pad outwardly to a 7 degree negative inclination for contacting the bottle side to apply a label thereto.

The label applying device according to this invention therefore provides a flexible labelling apparatus. Although various embodiments of this apparatus have been described herein in detail, it is understood by those skilled in the art, that variations may be made thereto without departing from the spirit of the invention or the scope of the appended claims.

What is claimed is:

1. A label applying device for use with automatic labelling apparatus having conveyor means for conveying articles to be labelled, said device comprising a body portion, a label carrier means pivotally mounted about a horizontal axis on said body portion, where said horizontal axis is below said label carrier means, said body portion being rotated about a vertical axis, the rotation of said body portion being synchronized with the movement of conveyed articles so that a label is applied to each article as it is conveyed past said device, pivot control means for pivoting said label carrier means in a controlled manner about said horizontal axis, said pivot control means gradually pivoting said label carrier downwardly towards a label applying position as said label carrier is rotated towards a conveyed article to be labelled and said pivot control means instantly pivoting said label carrier to and from the label applying position when such conveyed article is in position to receive a label, the extent to which said label carrier means is pivoted to contact such article being determined by the inclination of an article surface to which a label is to be applied.

2. A label applying device of claim 1 wherein said pivot control means comprises a gear member connected to said label carrier means and rotatable about said horizontal axis, a pivotally mounted gear segment intermeshed with said gear member, a cam follower mounted on said gear segment, a circular stationery cam, said cam follower being spring biased to remain against said cam as said body portion rotates, the circumferential shape of said cam determining the location of said label carrier means during a complete revolution, and the portion of said cam which causes said label carrier means to be swung to and from label applying position includes a circumferential interruption to cause the instant pivoting of said label carrier to and from label applying position, said interruption following the cam portion which causes the gradual pivoting of the label carrier means.

3. A label applying device of claim 2, wherein said circumferential interruption is a projecting hump on the surface of the cam on which said follower travels.

4. A label applying device of claim 1 wherein the circumferential configuration of a portion of said cam is such that said label carrier means remains vertical to receive a label and have glue applied to the label by a glue applying means, said cam having a two position moveable part which is located in the area of the cam which determines the label carrier means' position at the glue applying means, a first position for said part maintains said label carrier means in a vertical position and a second position for said part withdraws said label carrier means, sensing means for sensing when a label is on said label carrier means; in the absense of a label, said sensing means actuating means which moves said moveable part to said second position so that said label carrier means is withdrawn to thereby miss said glue applying means.

5. A label applying device of claim 2 wherein the portion of the cam which causes said label carrier means to be swung in contacting an article is interchangeable, the shape of the interchangeable portions varying so that the position to which said label carrier means is swung to apply a label can be varied from approximately minus 15 degrees through to plus 90 degrees.

6. A label applying device of claim 2 wherein said gear member and said gear segment have helical shaped gear teeth.

7. A label applying device of claim 1 wherein said label carrier means has a resilient pad portion which is compressed slightly upon contact with an article to which a label is being applied.

8. A label applying device of claim 1 wherein a plurality of label carrier means are mounted on and symmetrically spaced about said body portion, a separate pivot control means being provided for each label carrier means, the rotation of said body portion being synchronised with the movement of the conveyed articles so that a label is applied to each article conveyed past said device.

9. A label applying device of claim 1 wherein said label carrier means has ports on its surface which are overlayed by a label, vacuum being applied to said ports on receipt of a label and a blast of pressurized air being applied to said ports the instant such label is applied to an article.

10. In a labelling apparatus, a label applying means for applying a label to an article, conveyor means for conveying an article past said label applying means, means for providing a label on said label applying means, said label applying means comprising a hub rotatable about a vertical axis and having a label carrier means pivotally mounted about a horizontal axis on said hub, said horizontal axis being below said label carrier means, pivot control means for controlling the position of said label carrier means, said pivot control means being timed to pivot gradually said label carrier means about said horizontal axis in a direction towards a position at which said label carrier means contacts and applies such label to an article as such article is conveyed past said label applying means, said pivot control means instantly pivoting said label carrier to and from said article contacting position when such conveyed article is in position to receive a label.

11. In a labelling apparatus of claim 10, said pivot control means being adjustable to vary the position to and from which it pivots said label carrier means in applying a label to an article, such position being determined by the slope of an articles surface to which a label is to be applied.

12. In a labelling apparatus of claim 11 said adjustable pivot control means including means which consists of interchangeable portions, each portion determining a particular position to which said label carrier means is pivoted on label application.

13. In a labelling apparatus of claim 10, said pivot control means including a gearing arrangement for pivoting said label carrier means, said gearing arrangement being mounted on said hub, a cam follower connected to said gearing arrangement, a stationary cam over which said cam follower travels, said cam determining the position of said label carrier means as said hub rotates, said cam including a circumferential interruption which determines said instant contact of label carrier with such conveyed article.

14. In a labelling apparatus of claim 13 or 16, said circumferential interruption being a projecting hump on the controlling surface of said cam.

15. In a labelling apparatus of claim 13, the portion of said cam which causes said label carrier means to be pivoted to an article contacting position being interchangeable with other cam portions, such cam portions being of different shapes to thereby vary such article contacting position, the selection of the cam portion being determined by the shape of an article to be labelled.

16. In a labelling apparatus of claim 10, said pivot control means comprising a gear member mounted on said label carrier means rotatable about said horizontal axis, a pivotally mounted gear segment intermeshed with said gear member, a cam follower mounted in said pivoted gear segment, a circular stationary cam which is contacted by said cam follower, the circumferential shape of said cam determining the position of said label carrier means during its rotation, and spring means for maintaining said cam follower against said cam, and the portion of said cam which causes said label carrier means to be swung to and from label applying position includes a circumferential interruption to cause the instant pivoting of said label carrier to and from label applying position, said interruption following the cam portion which causes the gradual pivoting of the label carrier means.

17. In a labelling apparatus of claim 16, the circumferential configuration of said cam for normal operation being such that said label carrier means remains vertical to receive a label and have glue applied thereto by a glue applying means, said cam having a moveable portion of two positions, a first position for said moveable portion maintaining said label carrier means in a vertical position to contact said glue applying means and a second position which causes said label carrier means to move inwardly when it passes said glue applying means, sensing means for sensing when a label is on said label carrier means; in the absense of a label said sensing means actuating means to move said moveable portion of the cam to said second position so that said label carrier means misses said glue applying means.

18. In a labelling apparatus of claim 17, said cam having interchangeable portions located on the cam in the area which determines the position of said label carrier means for contacting an article, said interchangeable portions varying in configuration so that the position of said label carrier means in applying a label can be varied from approximately minus 10 degrees through to plys 90 degrees.

19. In a labelling apparatus of claim 16, said gear member and said gear segment having helical shaped gear teeth.

20. In a labelling apparatus of claim 10, a plurality of label carrier means being symmetrically mounted around said hub, a separate pivot control means for each label carrier means, the speed of rotation of said hub being synchronized with the conveyed movement of article so that a label is applied to each article conveyed past said label applying means.

21. In a labelling apparatus of claim 13 or 16, adjustment means being provided on said cam follower to facilitate positioning of said label carrier means in a vertical position.

22. In a labelling apparatus of claim 10, said label carrier means having a resilient pad portion which is compressed slightly upon contact with an article to which a label is being applied.

23. In a labelling apparatus of claim 10, said label carrier means having parts on it surface which are overlayed by a label, vacuum being applied to said parts on receipt of a label and a blast of pressurized air being applied to said parts the instant such glued label is applied to an article.

* * * * *